(12) United States Patent
Ohkubo

(10) Patent No.: US 6,273,227 B1
(45) Date of Patent: Aug. 14, 2001

(54) LOCKUP DEVICE FOR TORQUE CONVERTER

(75) Inventor: Mamoru Ohkubo, Neyagawa (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/522,394

(22) Filed: Mar. 9, 2000

(30) Foreign Application Priority Data

Mar. 17, 1999 (JP) .................................................. 11-071228

(51) Int. Cl.⁷ .................................................. F16H 45/02
(52) U.S. Cl. ........................ 192/3.29; 192/205; 192/213; 464/67
(58) Field of Search .................. 192/3.28, 3.29, 192/3.3, 205, 212, 213; 464/67

(56) References Cited

U.S. PATENT DOCUMENTS

| | | | | |
|---|---|---|---|---|
| 1,889,698 | * | 11/1932 | Reed ..................................... | 192/212 |
| 4,518,071 | * | 5/1985 | Nozawa .............................. | 467/67 X |
| 4,949,822 | * | 8/1990 | Martin ................................... | 192/3.3 |
| 5,337,867 | * | 8/1994 | Kirkwood ........................... | 192/3.29 |
| 5,575,364 | * | 11/1996 | Friedmann et al. ................. | 192/3.29 |
| 5,810,140 | * | 9/1998 | Billet et al. ......................... | 192/3.29 |
| 5,984,065 | * | 11/1999 | Teramae et al. .................... | 192/3.28 |
| 6,056,102 | * | 5/2000 | Ohkubo et al. ...................... | 192/205 |
| 6,106,400 | * | 8/2000 | Mizukami .............................. | 464/67 |

FOREIGN PATENT DOCUMENTS 10-196764 (A) * 7/1998 (JP) .

* cited by examiner

*Primary Examiner*—Richard M. Lorence
(74) *Attorney, Agent, or Firm*—Shinjyu Global IP Counselors, LLP

(57) ABSTRACT

A lockup device 6 of a torque converter 1 includes a damper mechanism 31. The damper mechanism 31 includes a drive plate 36, a driven plate 35, coil springs 37 and a ring 38. The coil springs 37 transmit a torque between the drive plates 36 and driven plate 35. The coil springs 37 are aligned in the rotational direction of the torque converter 1, and extend in the rotating direction. The ring 38 allows movement of the coil springs 37 in rotational directions, while preventing movements in other directions. The ring 38 is supported by one of the drive and driven plates 36 and 35, and extends through the coil springs 37. The ring 38 allows an increase in coil diameters of the coil springs 37 that are used in the lockup device 6 of the torque converter 1.

21 Claims, 14 Drawing Sheets

LOCKUP DEVICE FOR TORQUE CONVERTER

BACKGROUND OF THE INVENTION

1. Field of the Invention

This invention relates to a lockup device of a torque converter. More specifically, the present invention relates to a lockup device having a plurality of coil springs aligned in a circumferential direction.

2. Background Information

Torque converters usually include a fluid coupling mechanism for transmitting torque between the crankshaft of an engine and the input shaft of an automatic transmission. A torque converter has three types of runners (impeller, turbine, stator) located inside for transmitting the torque by means of an internal hydraulic oil or fluid. The impeller is fixedly coupled to the front cover that receives the input torque from the crankshaft of an engine. The hydraulic chamber formed by the impeller shell and the front cover is filled with hydraulic oil. The turbine is disposed opposite the front cover in the hydraulic chamber. When the front cover and the impeller rotate together, the hydraulic oil flows from the impeller to the turbine, and the turbine rotates. As a result, the torque is transmitted from the turbine to the main drive shaft of the transmission.

Generally, a torque converter can perform smooth acceleration and deceleration because it transmits a power via fluid. However, an energy loss occurs due to slip of the fluid, resulting in low fuel consumption. Accordingly, in recent years to improve fuel efficiency, some of the conventional torque converters have included a lockup device for mechanically coupling a front cover on an input side and a turbine on an output side. Specifically, the lockup device is disposed in a space located axially between the front cover and the turbine. When the torque converter reaches predetermined operating conditions, the lockup device of the torque converter causes power from the crankshaft of the engine to be directly transmitted to the automatic transmission, and thus, bypassing the fluid coupling device.

Usually, such lockup devices typically include a disk-like piston and a damper mechanism having a retaining plate, torsion springs and a driven member. The piston can be pressed against the front cover. The retaining plate is secured to an outer peripheral section of the piston. The torsion springs are supported by the retaining plate in a rotational direction and at the outer peripheral side of the retaining plate. The driven member supports the opposing ends of each torsion spring in a rotational direction. The driven member is secured to a turbine shell or a turbine hub of the turbine.

As the lockup device is activated, torque is transmitted from the front cover to the piston and then to the turbine through the torsion springs. Furthermore, as the torque fluctuations are transmitted from an engine to the lockup device, the torsion springs are compressed between the retaining plate and the driven member in the damper mechanism, such that torsional vibrations are absorbed and dampened. In other words, the damper mechanism unctions as a torsional vibration dampening mechanism to dampen vibration in the lockup clutch.

The piston carries an annular friction member adhered to a position opposed to a flat friction surface of the front cover. This portion of the piston and the friction surface of the front cover form a clutch coupling portion-of the lockup device. When a clutch coupling portion of the lockup device operates, the torque is transmitted from the front cover to the piston. The torque thus transmitted is further transmitted from the retaining plate to the driven plate via the coil springs, and then to the turbine. Torsional vibrations transmitted from the front cover are absorbed and dampened by the coil springs that are compressed between the retaining plate and the driven plate.

The piston is disposed to divide the space between the front cover and the turbine into a first hydraulic chamber on the front cover side and a second hydraulic chamber on the turbine side. As a result, the piston can move axially close to and away from the front cover due to the pressure difference between the first hydraulic chamber and the second hydraulic chamber. When the hydraulic oil in the first hydraulic chamber is drained and the hydraulic pressure in the second hydraulic chamber increases in pressure, the piston moves toward the front cover side. This movement of the piston causes the piston to strongly press against the front cover.

In the conventional lockup device, the operation of the piston is controlled by the working fluid flowing through the main unit of the torque converter. More specifically, a hydraulic operation mechanism in an external position supplies the working fluid to a space between the piston and the front cover when the lockup device is disengaged. This working fluid flows radially outward through the space between the front cover and the piston, and then flows from its radially outer portion into the main unit of the torque converter. When the lockup device is engaged, the working fluid in the space between the front cover and the piston is drained from its radially inner portion so that the piston moves toward the front cover. Thereby, the friction member arranged on the piston is pressed against the friction surface of the front cover. In this manner, the torque of the front cover is transmitted to the turbine via the lockup device.

There is an increasing demand for higher performance damper mechanisms. The demand dictates for damper mechanisms that can be utilized at lower vehicle speeds and higher torque levels. In a recently introduced torque converter, torque is transmitted through fluid only as acceleration commences from a standstill. In other words, the torque transmitted via the fluid is performed only during a start operation. In such torque converter, the lockup device is set to an engagement state as soon as the vehicle reaches a certain low speed such as 10 km/h. In such a vehicle that has an increased lockup range, the performance of the coil springs needs to be improved such that the torsional vibrations due to torque variations of the engine are absorbed and dampened sufficiently.

However, in a conventional lockup device described above, a coil diameter of the coil spring cannot be sufficiently increased due to the following reason. Radially opposite sides of the coil springs are supported by the retaining plate. The retaining plate has at its outer periphery a cylindrical portion for bearing loads from the coil springs. In other words, the coil springs are arranged on the outer peripheral portion of the retaining plate and tend to move radially outward due to a centrifugal force that causes outward deflection of the coil springs. The coil diameters of the coil springs cannot be increased sufficiently because the member that radially supports opposite sides of the coil springs further limits the space available to the coil springs. Furthermore, the lockup device is arranged in an axially restricted space within the torque converter.

In view of the above, there exists a need for a lockup device of a torque converter which overcomes the above mentioned problems in the prior art. This invention addresses this need in the prior art as well as other needs, which will become apparent to those skilled in the art from this disclosure.

SUMMARY OF THE INVENTION

One object of the present invention is to provide a lockup device of a torque converter that allows an increase in the coil diameters of the coil springs for use in a lockup device.

Another object of the present invention is to provide a lockup device for use in a torque converter for mechanically engaging and disengaging input and output members of the torque converter. The lockup device includes a clutch coupling portion and a damper mechanism. The damper mechanism can transmit a torque to the clutch coupling portion. The damper mechanism has a drive member, a driven member, a plurality of coil springs and an annular member. The drive member can receive the torque from the input member. The driven member can transmit the torque to the output member. The plurality of coil springs transmits the torque between the drive member and driven member. The plurality of coil springs is aligned in a rotational direction of the torque converter, and extends in the rotational direction. The annular member allows movement of the plurality of the coil springs in the rotational direction, and restricts movement thereof in other directions. The annular member is supported by one of the drive member and driven member, and extends through the plurality of coil springs.

In this lockup device of the torque converter, the torque is transmitted to the output member via the damper mechanism when the lockup device is in the clutch engagement state. At that time, the damper mechanism transmits the torque from the drive member to the driven member via the coil springs.

As rotational variations of the engine are transmitted to the input member, the coil springs of the damper mechanism become compressed between the drive and driven members. In this manner, torsional vibrations are absorbed and dampened. In this operation, the plurality of coil springs is compressed in the rotating direction along the annular member.

In this lockup device, since the annular member extends through the plurality of coil springs to restrict movement of the coil spring, no additional member is required for supporting the coil spring outside the coil spring. Consequently, the plurality of coil springs can increase its coil diameter, and therefore improve its performance.

Preferably, this lockup device further includes a plurality of spring seats. The spring seats are arranged on the opposite ends of the plurality of coil springs. The spring seat is provided with an aperture, through which the annular member extends. The spring seat has a seat portion and a projection. The coil spring is in contact with the seat portion. The projection extends from the seat portion into the coil spring for engagement with the coil spring.

In this lockup device, the annular member extends through the aperture of the spring seat. In this manner, the plurality of spring seats supports the annular member.

Preferably, in the lockup device, the aforementioned one of the drive and driven members restricts the radially outward movement of the annular member.

Preferably, in the lockup device, the annular member is relatively unrotatable with respect to the aforementioned one of the drive and driven members.

Preferably, in the lockup device, one of the drive and driven members is in contact with the spring seat to restrict the radially outward movement of the spring seat.

In this lockup device, the radially outward movement of the spring seat is restricted. Therefore, the spring seat and the annular member are not likely to contact one another. Consequently, no friction occurs between the spring seats and the annular member during compression of the coil springs. Further, since the coil springs are supported by the spring seats, the coil springs and the annular member are not likely to contact one another either.

Preferably, in the lockup device, one of the drive and driven members restricts the relative rotation and radially outward movement of the annular member. The other of the drive member and the driven member restricts the radially outward movement of the spring seat while in contact with the spring seat.

In this lockup device, the radially outward movement of the annular member is prevented by one of the drive member and driven member, while the radially outward movement of the spring seat is prevented by the other of the drive member and driven member. Accordingly, a predetermined space is maintained between the aperture of the spring seat and the annular member. Consequently, no contact, in other words, no friction occurs between the spring seat and the annular member, and between the coil spring and the annular member.

Preferably, in the lockup device, the plurality of coil springs includes a pair of coil springs arranged in the rotational direction so as to operate in series. The lockup device of the torque converter further includes an intermediate seat. The intermediate seat is disposed between the pair of coil springs. The intermediate seat has an aperture through which the annular member passes.

In this lockup device, the intermediate seat is supported by the annular member. Preferably, in the lockup device, the intermediate seat has a seat portion and a roller. The seat portion is in contact with the pair of coil springs. The roller is rotatable with respect to the seat member around an axis parallel to an axial direction of the lockup device. The roller is in contact with a radially inner side of the annular member.

In this the lockup device, the roller is in contact with the radially inner side of the annular member when the intermediate seat moves radially outward due to a centrifugal force. For example, if one of the pair of coil springs has a lower rigidity than the other, the coil spring having the lower rigidity is primarily compressed as the compression of the coil springs starts. Consequently, relative rotation occurs between the intermediate seat and the annular member. At this point, the annular member moves in the rotating direction while keeping contact with the roller, and thereby rotates the roller of the intermediate seat. In this manner, only small friction occurs between the annular member and the intermediate seat.

Preferably, in the lockup device, the roller has a contact portion arranged to contact axial side portions of the annular member. In this lockup device, the roller restricts the axial movement of the annular member. Therefore, no friction occurs between the annular member and the seat portion of the intermediate seat.

Another object of the present invention is to provide a torque converter adapted to be used to transmit torque from an input shaft to an output shaft. The torque converter includes a front cover, an impeller, a turbine, a stator and a lockup device. The front cover has a friction surface at an outer peripheral portion thereof. The impeller is fixedly coupled to the front cover to form a hydraulic chamber together with the front cover. The turbine is disposed opposite the impeller inside the hydraulic chamber. The turbine is adapted to be coupled to the output shaft. The stator is disposed between the impeller and the turbine. The lockup device is for mechanically engaging and disengaging input and output members of the torque converter. The lockup device includes a clutch coupling portion and a damper mechanism. The damper mechanism can transmit a torque to and from the clutch coupling portion. The damper mechanism has a drive member, a driven member, a plurality of coil springs and an annular member. The drive member can receive the torque from the input member. The driven member can transmit the torque to the output member. The plurality of coil springs transmits the torque between the drive member and driven member. The plurality of coil springs is aligned in a rotational direction of the torque converter, and extends in the rotational direction. The annular member allows movement of the plurality of the coil springs in the rotational direction, and restricts movement thereof in other directions. The annular member is supported by one of the drive member and driven member, and extends through the plurality of coil springs.

In one embodiment of the torque converter of the present invention, the lockup device is disposed on a transmission side with respect to the piston. In another embodiment, the lockup device is disposed on an engine side with respect to the piston. The damper mechanism of the present invention can be disposed on either the transmission side or the engine side of the torque converter with respect to the clutch coupling portion.

These and other objects, features, aspects and advantages of the present invention will become readily apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
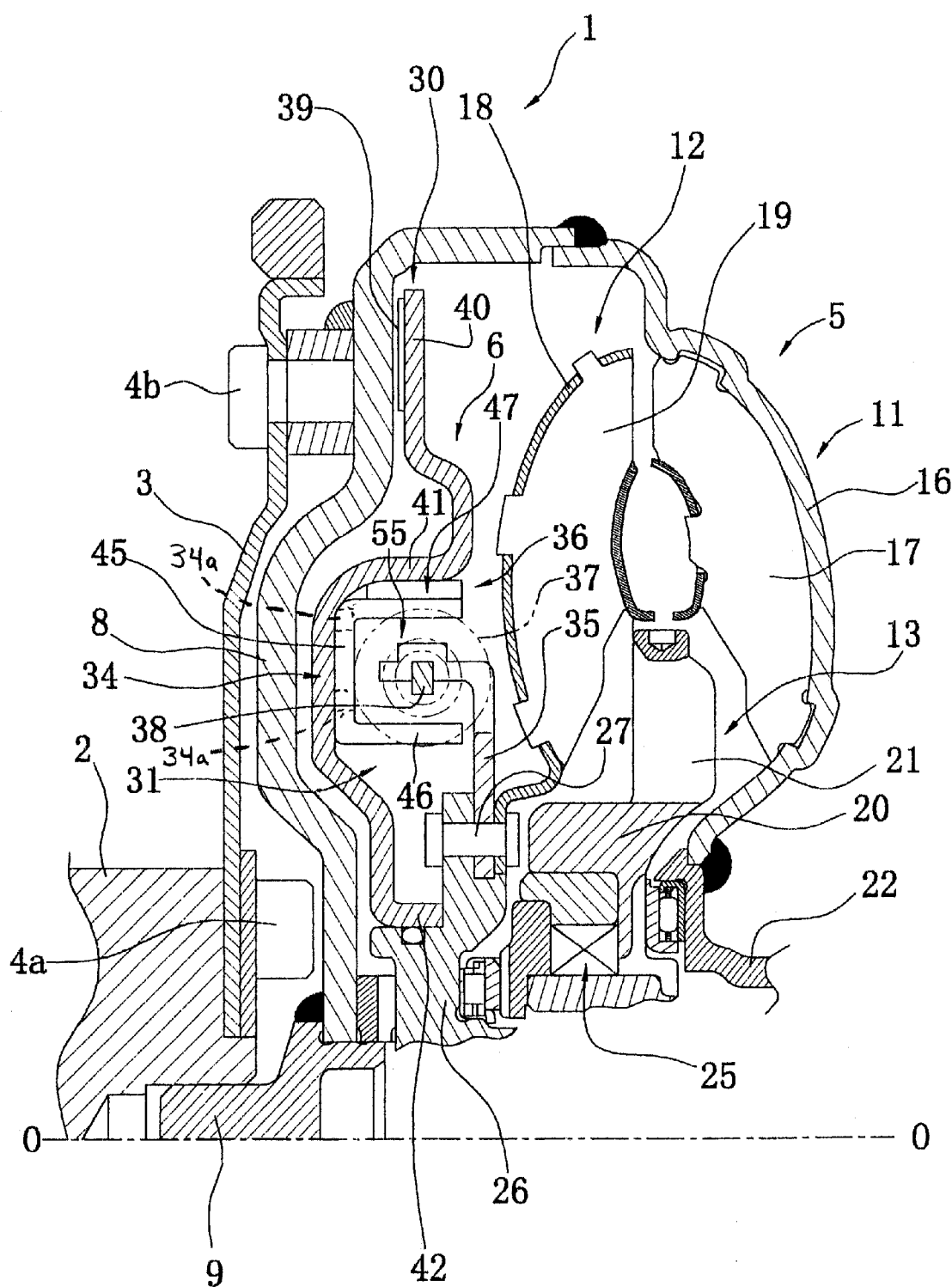
FIG. 1 is a simplified longitudinal cross-sectional view of a torque converter with a lockup device in accordance with a first embodiment of the present invention.

Referring initially to FIG. 1, a simplified longitudinal cross-sectional view of a torque converter 1 with a lockup device 6 is illustrated in accordance with a first embodiment of the present invention. The torque converter 1 is a device for transmitting a torque from a crankshaft 2 of an engine to an input shaft (not shown) of a transmission. The engine (not shown) is arranged on the left hand side of FIG. 1, while the transmission is disposed on the right hand side. In FIG. 1, center line O—O indicates a rotation axis of the torque converter 1.

A flexible plate 3 is disposed between the torque converter 1 and the crankshaft 2. The flexible plate 3 is made of a thin circular plate member. The flexible plate 3 transmits a torque between the torque converter 1 and the crankshaft 2, and absorbs bending vibrations transmitted from the crankshaft 2 to the torque converter 1. A radially inner portion of the flexible plate 3 is fixedly coupled to an end surface of the crankshaft 2 by a plurality of bolts 4a (only one shown). A radially outer portion of the flexible plate 3 is fixedly coupled to a front cover 8 of the torque converter 1 by a plurality of bolts 4b (only one shown).

The front cover 8 is a circular plate member arranged adjacent to the transmission side of the flexible plate 3. A friction surface is formed on the transmission side of an outer peripheral portion of the front cover 8. The inner peripheral portion of the front cover 8 is welded to a center boss 9. The center boss 9 is a columnar or cylindrical member extending in the axial direction. The center boss 9 is inserted into a central bore formed at an end of the crankshaft 2.

The torque converter 1 basically includes a torus 5 and a lockup device 6. The torus 5 is formed of three kinds of runners (an impeller 11, a turbine 12 and a stator 13).

The impeller 11 basically includes an impeller shell 16, a plurality of impeller blades 17 and an impeller hub 22. The impeller blades 17 are fixedly coupled to the radially inner side of the impeller shell 16. The impeller hub 22 is fixedly coupled to the inner periphery of the impeller shell 16. The front cover 8 has on its radially outer portion a radially outer cylindrical portion 8a, which extends axially toward the transmission. An end of the cylindrical portion 8a is welded to an outer periphery of the impeller shell 16 of the impeller 11. In this manner, the front cover 8 and the impeller 11 form a hydraulic fluid chamber having hydraulic oil filled therein.

The turbine 12 is disposed opposite the engine side of the impeller 11 inside the hydraulic fluid chamber. The turbine 12 basically includes a turbine shell 18 and a plurality of turbine blades 19 fixedly coupled to the impeller side of the turbine shell 18. The radially inner portion of the turbine shell 18 is fixedly coupled to a flange of a turbine hub 26 by a plurality of rivets 27. The turbine hub 26 is non-rotatably coupled to an input shaft (not shown).

The stator 13 is a mechanism for regulating a flow of the hydraulic oil that returns from the turbine 12 to the impeller 11. The stator 13 is a one-piece member formed by molding resin, aluminum alloy, or the like. The stator 13 is arranged between the radially inner portions of the impeller 11 and the turbine 12. The stator 13 basically includes an annular carrier 20 and a plurality of stator blades 21 formed on an outer peripheral surface of the carrier 20. The carrier 20 is supported by a stationary shaft (not shown) via a one-way clutch 25.

The lockup device 6 will now be explained. The lockup device 6 basically includes a clutch coupling portion 30 and a damper mechanism 31. The clutch coupling portion 30 and the damper mechanism 31 are arranged such that a torque can be transmitted in series while the clutch coupling portion is in the clutch engagement state. More specifically, the lockup device 6 basically includes a piston 34, a plurality of drive members 36, a driven member or plate 35, a plurality of spring seats 64, a plurality of coil springs 37 and a ring 38.

The piston 34 is a circular plate-like or disk-like member arranged adjacent to the transmission side of the front cover 8. The piston 34 extends in a radial direction relative to center line O—O. The outer diameter of the piston 34 is slightly smaller than the outer diameter of the front cover 8. The inner diameter of the piston 34 is slightly larger than the inner diameter of the front cover 8. The piston 34 axially divides the space between the front cover 8 and the turbine 12. The piston 34 has a radially outer portion which forms a flat and annular frictional coupling portion 40. An annular friction facing 39 is fixedly coupled to the engine side of the frictional coupling portion 40. When the piston 34 moves toward the front cover 8, the friction facing 39 comes into contact with the friction surface of the front cover 8, whereby the clutch is engaged. Accordingly, the frictional coupling portion 40 of the piston 34, the friction facing 39 and the friction surface of the front cover 8 form the clutch coupling portion 30.

The piston 34 is formed by a metal drawing process, such that its radially inner portion is axially closer to the engine side relative to its radially outer portion. Accordingly, the piston 34 has a cylindrical wall 41 at its radially middle portion, which extends in the axial direction to offset the outer and inner portions of the piston 34. The damper mechanism 31 is arranged on a radially inner side of the cylindrical wall 41 adjacent the turbine shell 18. Further, the piston 34 has at its inner periphery a cylindrical portion 42, which extends axially toward the transmission. The cylindrical portion 42 is supported for rotational and axial movement on the outer peripheral surface of the turbine hub 26. The end of the cylindrical portion 42 also contacts the engine side end of the turbine hub 26 when the lockup device 6 is in the disengaged position. Accordingly, the turbine hub 26 stops axial movement of the piston 34 toward the transmission.

The damper mechanism 31 will now be described. The damper mechanism 31 basically includes the drive member 36, the driven member 35, the spring seats 64, the coil springs 37 and the ring 38. The coil springs 37 are disposed so as to be aligned in the circumferential direction of the torque converter 1. Each of the coil springs 37 has a linear or arc shape that extends in the circumferential direction.

Each drive member 36 is disposed between the circumferentially adjacent ends of circumferentially adjacent coil springs 37. The drive member 36 is made of a metal such as SPHC or SPCC. The drive member 36 supports circumferentially opposite ends of adjacent coil springs 37, and thereby transmits torque to the coil springs 37. The drive members 36 are fixedly coupled to the piston 34 in a manner which will be described later. Each drive member 36 is arranged radially inside the cylindrical wall 41 of the piston 34.

Figure 5:
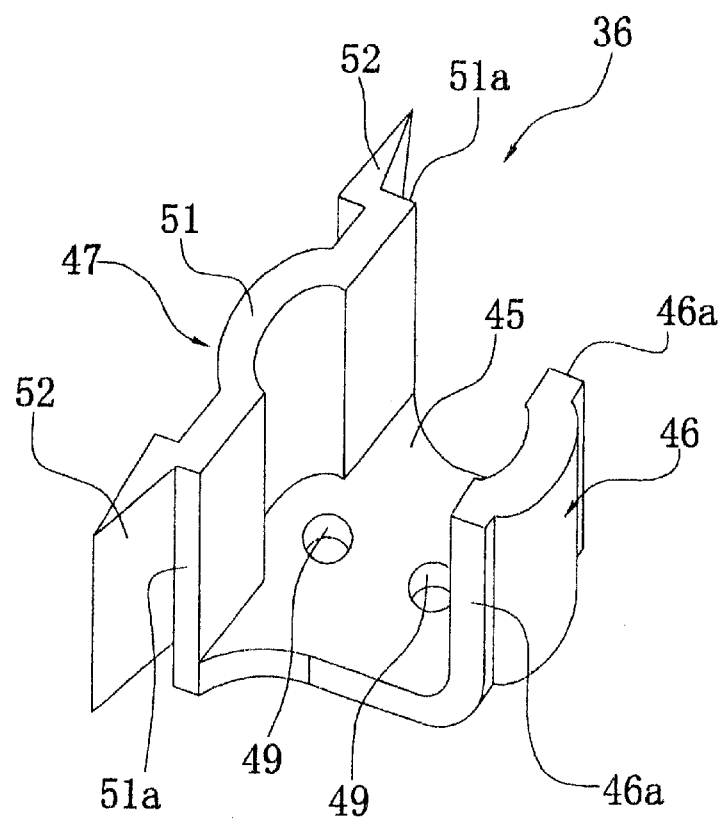
FIG. 5 is a perspective view of a drive plate for use in the lockup device in accordance with the first embodiment of the present invention.

Referring to FIG. 5, each drive member 36 includes a fixed portion 45, a radially inner contact portion 46 and a radially outer contact portion 47. The fixed portion 45 extends along a plane perpendicular to the rotation axis O—O of the torque converter 1. The fixed portion 45 is axially in contact with a portion of the piston 34 that is on a radially inner side relative to the cylindrical wall 41, i.e., on the transmission side thereof. As seen in FIG. 5, the fixed portion 45 is provided with two bores 49.

The piston 34 is formed by pressing, and includes a plurality of projections 34a at positions that correspond to the positions of the bores 49. The projections 34a are inserted to the bores 49 from the front cover 8 side. Then, the drive members 36 are fixedly coupled to the piston 34 by caulking. After the caulking, a hardening treatment using nitrogen is applied to the caulked portion. Of course, the drive members 36 can be fixedly coupled to the piston 34 by other means such as rivets, welds or other fastening techniques.

The inner contact portion 46 extends axially toward the transmission from the radially inner end of the fixed portion 45. The inner contact portion 46 has a support surface 46a at its circumferentially opposite ends. The outer contact portion 47 extends axially toward the transmission from the radially outer end of the fixed portion 45. The outer contact portion 47 includes a radially outer portion 51 and a pair of support portions 52 that extend in circumferentially opposite directions from circumferentially opposite ends of the radially outer portion 51. The radially outer portion 51 has support surfaces 51a at its circumferentially opposite ends. The contact portions 46 and 47 are curved in opposite directions, such that circumferentially middle portions project in radially opposite directions. Further, the support portions 52 on the opposite ends of the outer portion 51 extend further from the contact surfaces 51a in radially outward directions. The support portions 52 taper off toward their free ends in circumferentially opposite directions.

Figure 3:
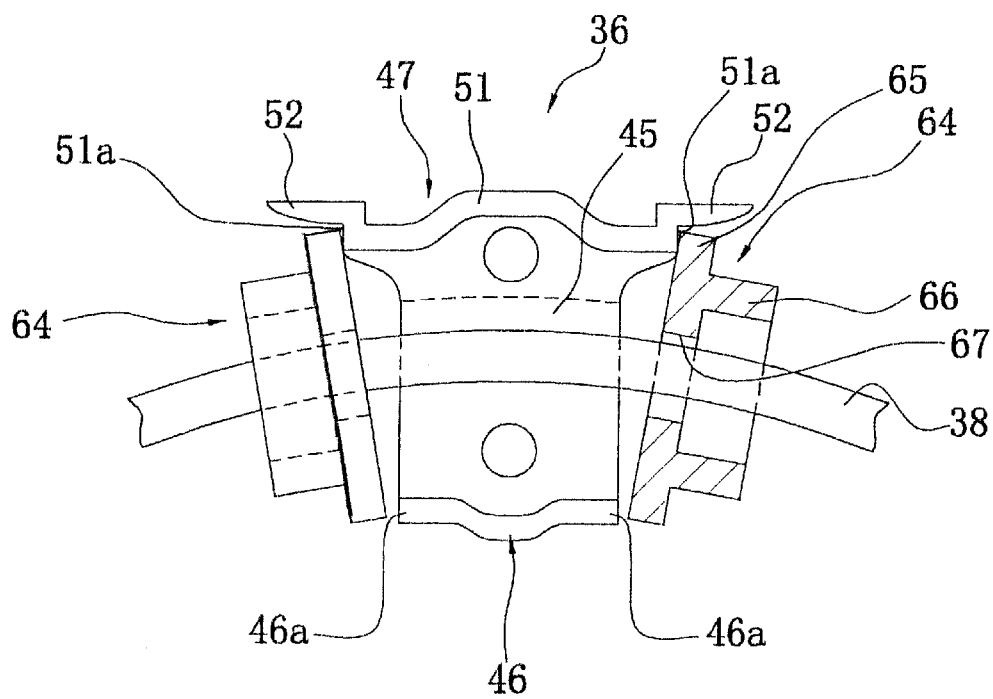
FIG. 3 is a plan view of the drive plate, a pair of spring seats and the ring of the damper mechanism illustrated in FIG. 2 for use in the lockup device in accordance with the first embodiment of the present invention as viewed in the direction of arrow III in FIG. 2.

Referring to FIG. 3, the end spring seats 64 are arranged on circumferentially opposite ends of each coil spring 37. The coil springs 37 are engaged with the drive members 36 and driven member 35 in the rotating direction via the end spring seats 64. Each end spring seat 64 includes a plate-shaped seat portion 65 and a tubular projection 66 extending from the seat portion. The seat portions 65 circumferentially support the circumferentially opposite ends of the coil spring 37. The seat portions 65 are supported by another member. The seat portion 65 has a bore 67 at its central portion. The projection 66 has a cylindrical form extending from the seat portion 65 into the coil spring 37. The outer periphery of the projection 66 is in contact with or adjacent to the inner side of the coil spring 37. In this manner, the circumferentially opposite ends of the coil springs 37 are fixedly coupled to the end spring seats 64. The radially outer portion of the end surface of the seat portion 65 is supported by the contact surface 51 a of the outer portion 51, whereas radially inner portion is supported by the support surface 46a of the inner contact portion 46.

Figure 2:
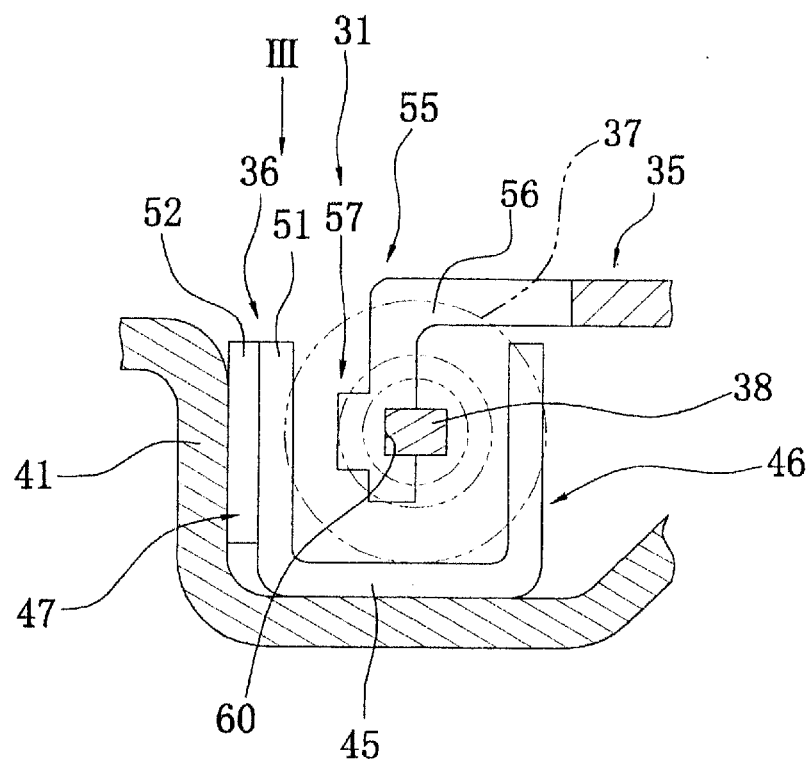
FIG. 2 is a partial enlarged cross sectional view of the damper mechanism for use in the lockup device illustrated in FIG. 1 in accordance with the first embodiment of the present invention.
Figure 4:
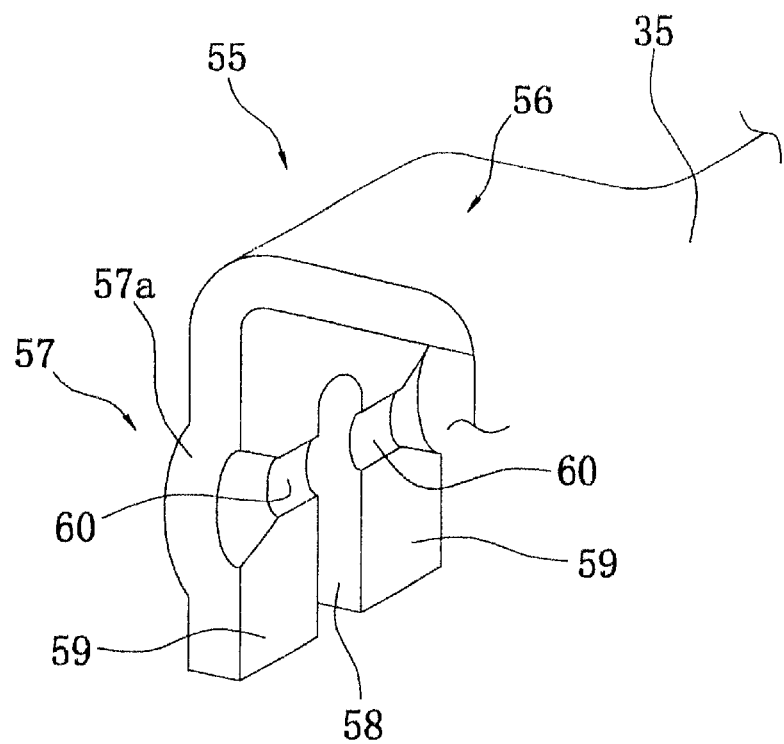
FIG. 4 is a partial perspective view of a driven plate for use in the lockup device in accordance with the first embodiment of the present invention.

Referring to FIG. 1, the driven member 35 is an annular plate member. The driven member 35 has a radially inner portion fixedly coupled to the turbine hub 26 together with the radially inner portion of the turbine shell 18 by the plurality of rivets 27. The driven member 35 has a plurality of claws 55 at its outer periphery. Each claw 55 is disposed between circumferential ends of adjacent coil springs 37 for receiving the torque from the coil springs 37. Referring to FIGS. 2 and 4, each claw 55 has a portion 56 extending radially outward from the center annular portion of the driven member 35 as well as a projection 57 extending axially toward the engine from the portion 56. The projections 57 are inserted into the spaces between the inner contact portions 46 and outer contact portions 47 of the drive members 36. The projections 57 have predetermined circumferential widths. Opposite end surfaces 57a of each projection 57 are in contact with the radially middle portions of a pair of adjacent seat portions 65 of a pair of adjacent end spring seats 64. Accordingly, the claws 55 are circumferentially movable with respect to the drive members 36. Each projection 57 has a slit 58 extending from its free end. The slit 58 divides the projection 57 into a pair of portions 59. Each projection 57 also has a circumferentially extending concavity 60 at its radially inner portion.

The ring 38 will now be explained. The ring 38 extends through the inner space of each of the coil springs 37. As seen in FIG. 3, the ring 38 also extends through the bores 67 of the spring seats 64, and through the spaces between the inner contact portions 46 and outer contact portions 47 of the drive members 36. The ring 38 is non-rotatably and radially non-movably engaged with the projections 57 of the claws 55.

Figure 6:
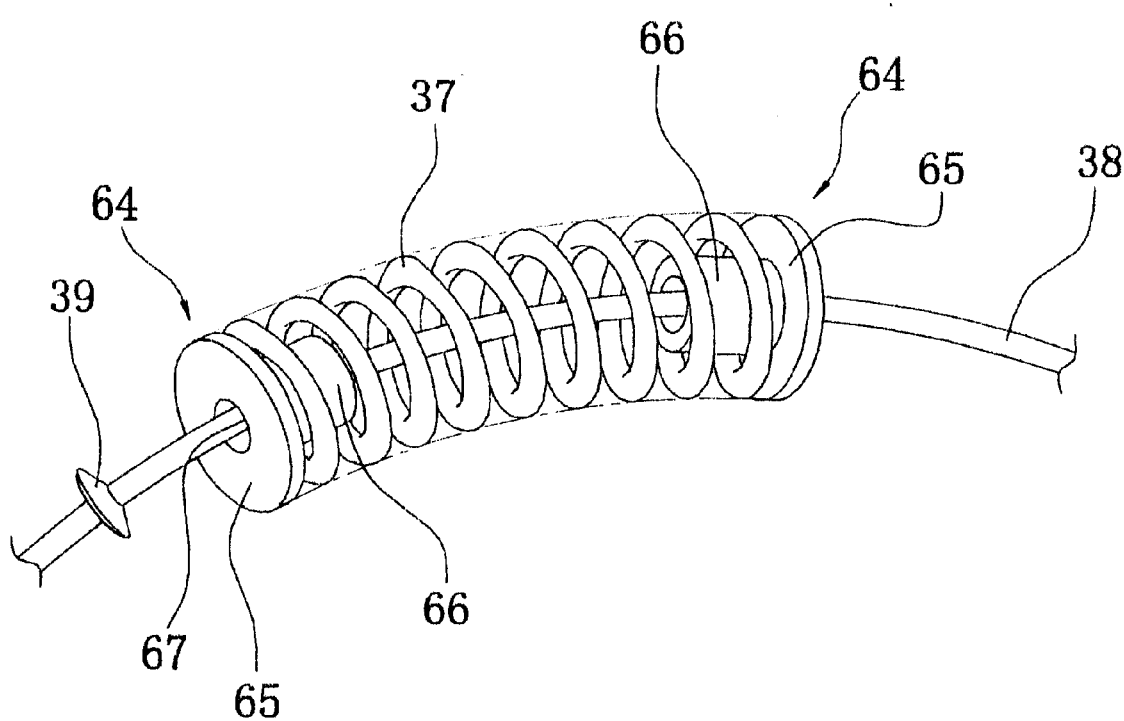
FIG. 6 is a perspective view of a coil spring, a ring and adjacent members for use in the lockup device in accordance with the first embodiment of the present invention.

More specifically, the ring 38 is in contact with the concavities 60 formed on the radially inner surface of the projections 57. Accordingly, axial and radial movements of the ring 38 are restricted. Since the ring 38 is pushed against the concavities 60 by the centrifugal force, the ring 38 will not disengage from the concavities 60. Referring to FIGS. 4 and 6, an engagement portion 39 (FIG. 6) formed on the ring 38 is inserted into the slit 58 (FIG. 4) formed in the projection 57. Accordingly, relative rotation between the ring 38 and the projections 57 is prevented. The engagement portion 39 is a lump portion formed on the ring 38 at the time of flush band welding for joining arc-shaped members together.

When there is no relative rotation between the piston 34 and the drive member 35, the seat portions 65 of the end spring seats 64 are in contact with the support portions 52 of the drive members 36, such that the drive members 36 prevent radially outward movement of the end spring seats 64. The ring 38 is also prevented from moving in the radially outward direction by the driven member 35. In this manner, a space is maintained between each bore 67 of each spring seat 64 and the ring 38, particularly in the radial direction therebetween.

Figure 7:
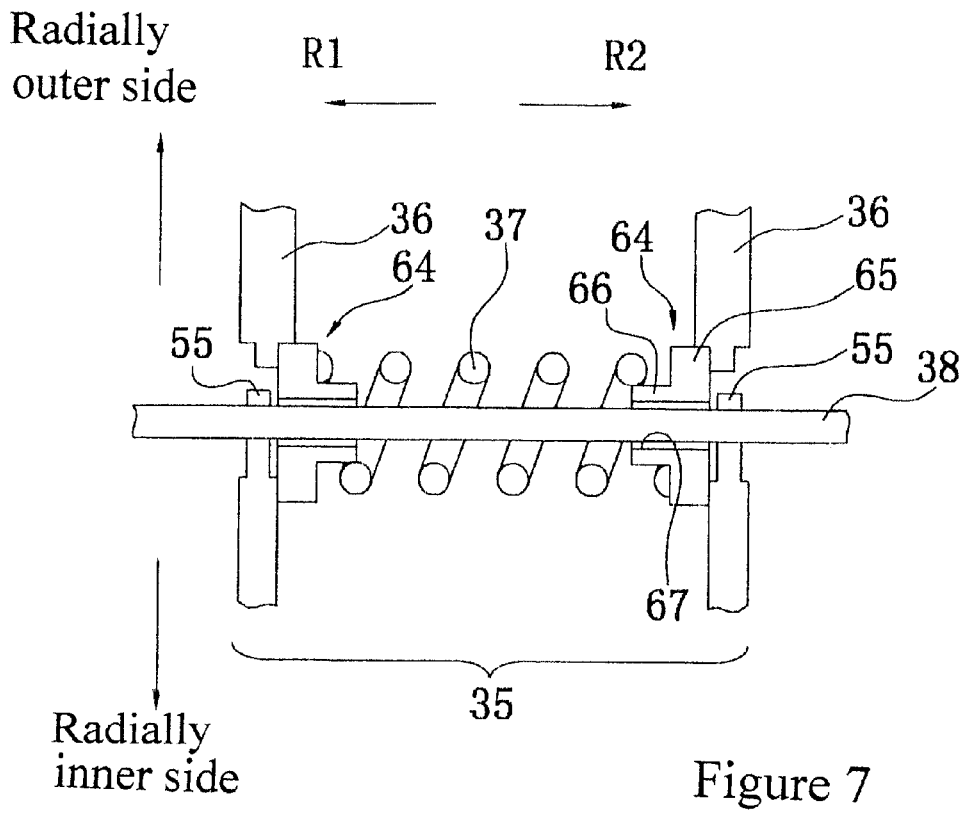
FIG. 7 is a partial simplified diagrammatic view of the damper mechanism showing an operation of the damper mechanism for use in the lockup device in accordance with the first embodiment of the present invention.
Figure 8:
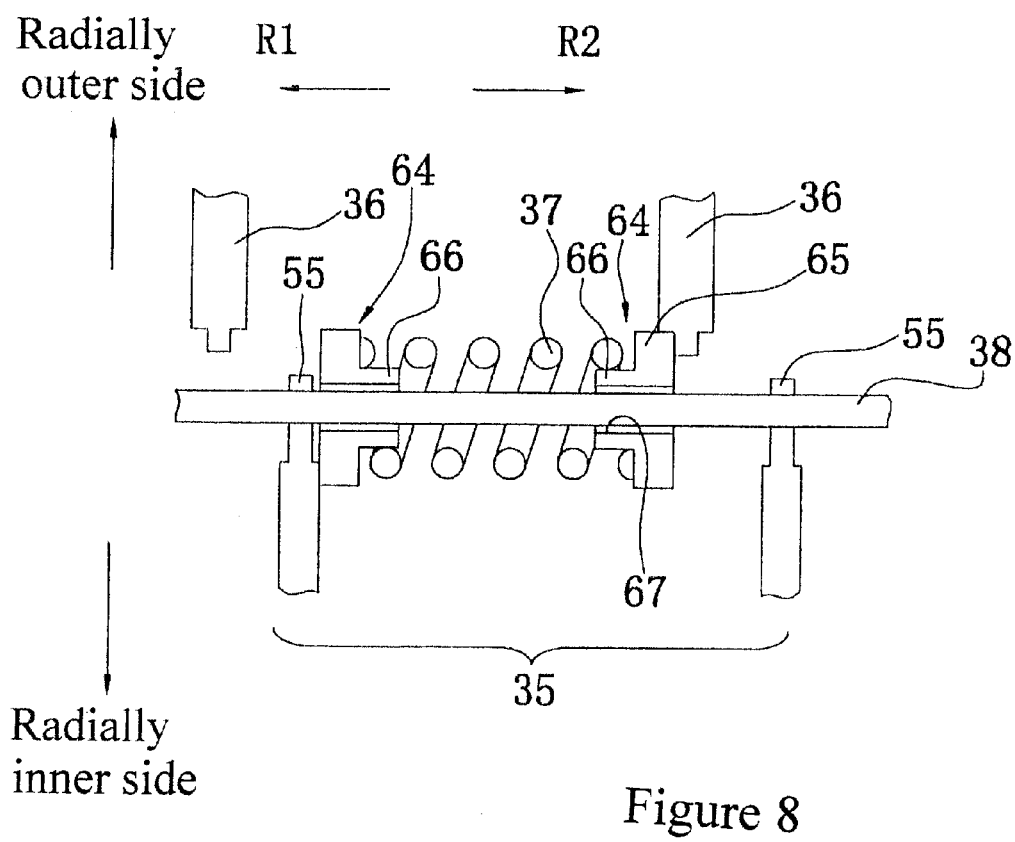
FIG. 8 is a partial simplified diagrammatic view of the damper mechanism showing an operation of the damper mechanism for use in the lockup device in accordance with the first embodiment of the present invention.

Referring to FIGS. 7–8, the operation of compressing the coil springs 37 in the rotating direction will now be explained. FIGS. 7–8 show simplified relationships between the drive members 36, the driven member 35, the ring 38, the spring seats 64 and one of the coil springs 37. In FIGS. 7–8, a leftward arrow means a R1 rotational direction, while a rightward arrow means a R2 rotational direction. Further, an upward arrow means the radially outer side, while a downward arrow means the radially inner side.

From the state shown in FIG. 7, the driven member 35 rotates in the R2 direction relative to the piston 34, with the piston 34 being fixedly coupled to another member. (FIGS. 7–8 do not show the piston 34.) Accordingly as seen in FIG. 8, the R1 sides of the claws 55 of the driven member 35 push the R1 sides of the spring seats 64 in the R2 direction. The coil springs 37 are compressed in the rotating direction between the R1 sides of the claws 55 and the R2 sides of the drive members 36. At the same time, the ring 38 and the R1 sides of the spring seats 64 move in the R2 direction together with the driven member 35. Accordingly, no relative rotation occurs between these members. Only relative rotation that occurs is between the R2 sides of the spring seats 64 and the ring 38. Moreover, the radial positions of the spring seats 64 do not change because radially outward movement of the spring seats 64 is prevented by the drive member 36. Therefore, a space is secured between the ring 38 and each bore 67 of the spring seats 64, as in the case where there is no relative rotation between the driven member 35 and the piston 34. Accordingly, the ring 38 and the spring seats 64 hardly contact each other. Consequently, little, if any, friction occurs between the ring 38 and the spring seats 64.

On the other hand, as seen in FIG. 8, the R1 sides of the spring seats 64 may be allowed to move in the radially outward direction, since the R1 sides of the drive members 36 do not engage the R1 sides of the spring seats 64. However, even if the R1 sides of the drive members 36 and the ring 38 contact each other, no friction occurs between the R1 sides of the spring seats 64 and the ring 38, since there is no relative rotation therebetween.

In this lockup device 6, the ring 38 extends through the coil springs 37 for restricting movement of the coil spring 37. In other words, the coil springs 37 do not interfere with the drive members 36 and driven members 35 in both radial and axial directions. Therefore, no additional member needs to be disposed outside the coil springs 37 for supporting the coil springs 37. As a result, the coil diameters of the coil springs 37 can be increased, and performance of the coil springs 37 can be improved.

Further, since no special structure is required for supporting the coil springs 37, the structure of the damper mechanism 31 can be simplified and reduced in size. For example, since the drive portion of the damper mechanism only has to support the spring seats 64, the drive portion does not need to have an annular shape. Accordingly, the drive portion is formed of a plurality of small drive members 36. As a result, the damper mechanism 31 of the present invention has reduced its weight and the volume of a space in which the damper mechanism 31 is to be disposed.

Second Embodiment

Figure 9:
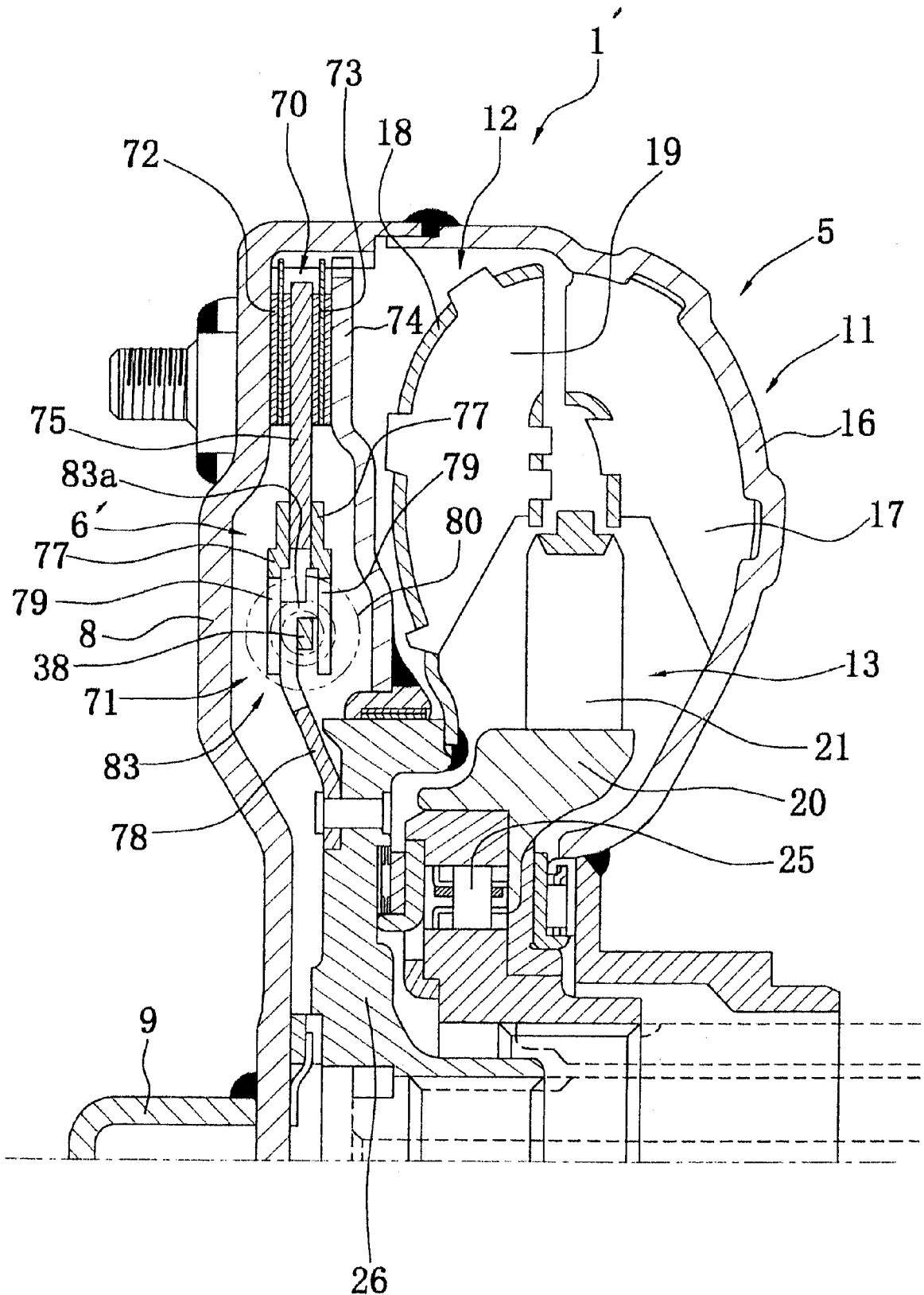
FIG. 9 is a simplified longitudinal cross-sectional view of a torque converter with a lockup device in accordance with a second embodiment of the present invention.

A lockup device 6' of a torque converter 1' is illustrated in FIG. 9 in accordance with a second embodiment of the present invention. In view of the similarities between the lockup device 6 of the first embodiment and the lockup device 6' of the second embodiment, the lockup device 6' will not be discussed or illustrated in detail herein. Moreover, the same or near identical parts of the lockup device 6' will be given the same reference numerals as the same or nearly identical parts of the lockup device 6, discussed above. In this lockup device 6', the ring 38 functions the same way as the ring 38 of the lockup device 6 of the first embodiment.

The lockup device 6' shown in FIG. 9 includes a clutch coupling portion 70 and a damper mechanism 71. The clutch coupling portion 70 includes a first friction disk 72, a second friction disk 73, a driven member 75 and a piston 74. The first friction disk 72 is disposed adjacent to the friction surface of the front cover 8. The second friction disk 73 is arranged axially on the transmission side of the first friction disk 72. The driven member 75 is disposed between the first friction disk 72 and the second friction disk 73.

The piston 74 is arranged on the transmission side of the second friction disk 73. The outer peripheries of the first and second friction disks 72 and 73 as well as the piston 74 non-rotatably and axially movably engage a plurality of projections formed on the outer cylindrical portion of the front cover 8. A radially inner portion of the piston 74 is rotatably and axially movably supported on the outer peripheral surface of the turbine hub 26. Each of the first and second friction disks 72 and 73 includes friction facings and an annular core plate. The friction facings are fixedly coupled to opposite sides of the core plate. The driven member 75 is an annular plate with a radial outer portion located between the first and second friction disks 72 and 73.

The damper mechanism 71 includes a pair of input plates 77, an output plate 78 and a plurality of coil springs 80. Details of the coil springs 80 such as the manner of arrangement are the same as in the first embodiment, and thus, will not be discussed or illustrated in detail herein. Each input plate 77 is an annular member that has a radial outer portion fixedly coupled to the radial inner portion of the driven member 75 by rivets (not shown). A plurality of projections 79 extends in a radially inward direction from the inner periphery of each input plate 77. Each projection 79 extends into a space between circumferential ends of the circumferentially adjacent coil springs 80 to contact with the circumferential ends. More specifically, each projection 79 is in contact with the seat portions of the end spring seats, which are identical or similar to the end spring seats 64 of the first embodiment.

The output plate 78 is an annular member that has a radially inner portion fixedly coupled to the turbine hub 26 by rivets. The output plate 78 has radial claws 83 at its outer periphery. Each claw 83 is located between circumferential ends of circumferentially adjacent coil springs 80 to contact with these circumferential ends, or more specifically, the spring seats. The claws 83 are arranged axially between the projections 79. The claws 83 are rotatable relative to the projections 79. The claw 83 has at its end a bent portion 83a for supporting the radially outer side of the ring 38. The bent portion 83a restricts radially outward movement of the ring 38. The claws 83 are non-rotatable relative to the ring 38.

This embodiment can achieve similar effects to those of the foregoing embodiment. In particular, the coil diameter of the coil spring 80 can be increased because the ring 38 supports the coil springs 80 and the spring seats.

Third Embodiment

Figure 10:
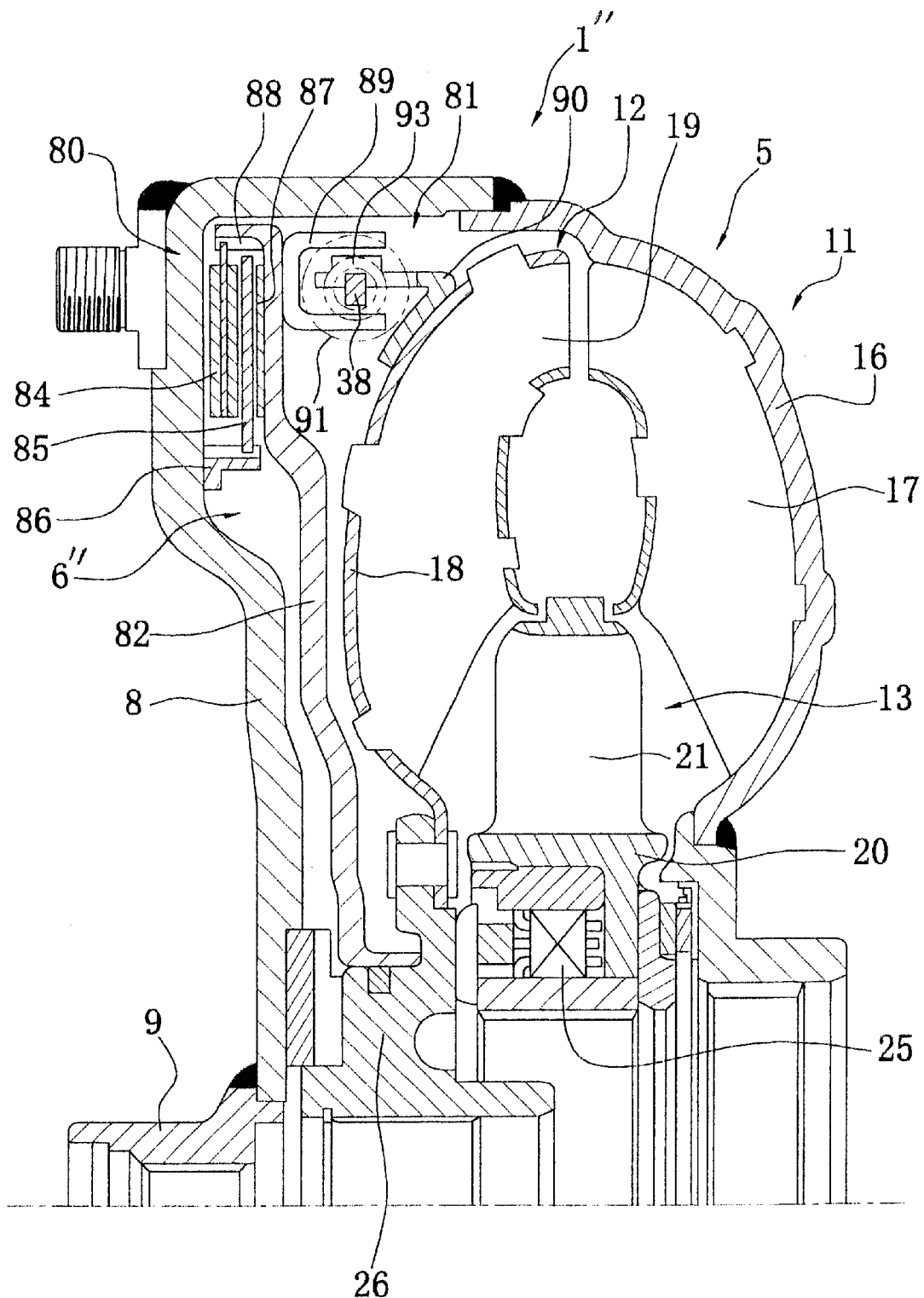
FIG. 10 is a simplified longitudinal cross-sectional view of a torque converter with a lockup device in accordance with a third embodiment of the present invention.

A lockup device 6" of a torque converter 1" is illustrated in FIG. 10 in accordance with a second embodiment of the present invention. In view of the similarities between the lockup device 6 of the first embodiment and the lockup device 6" of the third embodiment, the lockup device 6" will not be discussed or illustrated in detail herein. Moreover, the same or near identical parts of the lockup device 6" will be given the same reference numerals as the same or nearly identical parts of the lockup device 6, discussed above. In this lockup device 6", the ring 38 functions the same way as the ring 38 of the lockup device 6 of the first embodiment.

The lockup device 6" of the torque converter 1" shown in FIG. 10 primarily includes a clutch coupling portion 80 and a damper mechanism 81. The clutch coupling portion 80 basically includes a piston 82, a first friction disk 84 and a second friction disk 85. The first friction disk 84 is an annular member disposed adjacent to the friction surface of the front cover 8. The first friction disk 84 includes a core plate and friction facings fixedly coupled to the opposite sides of the core plate. The second friction disk 85 is an annular member disposed on axially the transmission side of the first friction disk 84.

The piston 82 is a circular disk-like member that is arranged in a space formed axially between the front cover 8 and the turbine 12. Inner and outer peripheries of the piston 82 almost reach the inner and outer peripheries of the space between the front cover 8 and the turbine 12. A friction facing 87 is fixedly coupled to an engine side surface of the radially outer portion of the piston 82. The friction facing 87 is facing the second friction disk 85. The piston 82 has at its outer periphery a cylindrical portion 88, which extends axially toward the engine. The cylindrical portion 88 has teeth, which protrude alternately in the radially inward and outward directions. The teeth 88 are engaged axially movably and unrotatably with the outer peripheral portion of the first friction disk 84. An annular engagement portion 86 is arranged in an inner position of the clutch coupling portion 80. The annular engagement portion 86 is fixedly coupled to the front cover 8. The engagement portion 86 has a plurality of teeth. The teeth are aligned in the circumferential direction and extend axially toward the transmission. These teeth are non-rotatably and axially movably engaged with the inner peripheral portion of the second friction disk 85.

The damper mechanism 81 primarily includes drive members 89, a driven member or plate 90, coil springs 91 and a ring 38. The drive members 89 are fixedly coupled to the transmission side surface of the outer peripheral portion of the piston 82. The drive members 89 are aligned in the circumferential direction so as to support circumferentially opposite ends of the coil springs 91. Each drive member 89 has at its inner and outer peripheries support portions which extend axially toward the transmission. The driven plate 90 has an annular portion and a projection 93. The annular portion is fixedly coupled to the turbine shell 18 of the turbine 12. The projection 93 extends axially toward the transmission from the outer periphery of the annular portion. The projection 93 is in contact with the circumferential ends of the coil springs 91. The projection 93 is located radially between the inner and outer peripheral portions of the drive member 89. The structure of the ring 38 as well as the relationship between the ring 38 and the coil springs 91 are the same as in the foregoing embodiments. The projection 93 has a bent portion holding the radially outer portion and the axial side portions of the ring 38.

As described above, the ring 38 can achieve similar effects in a structure in which the damper mechanism 81 is arranged axially on the transmission side with respect to the clutch coupling portion 80.

Fourth Embodiment

Referring now to FIGS. 11–18, a variation of the structure of the damper mechanism will now be described. This variation can be employed in the lockup devices 6, 6' or 6" in accordance with any of the foregoing embodiments as well as modification thereof.

Figure 11:
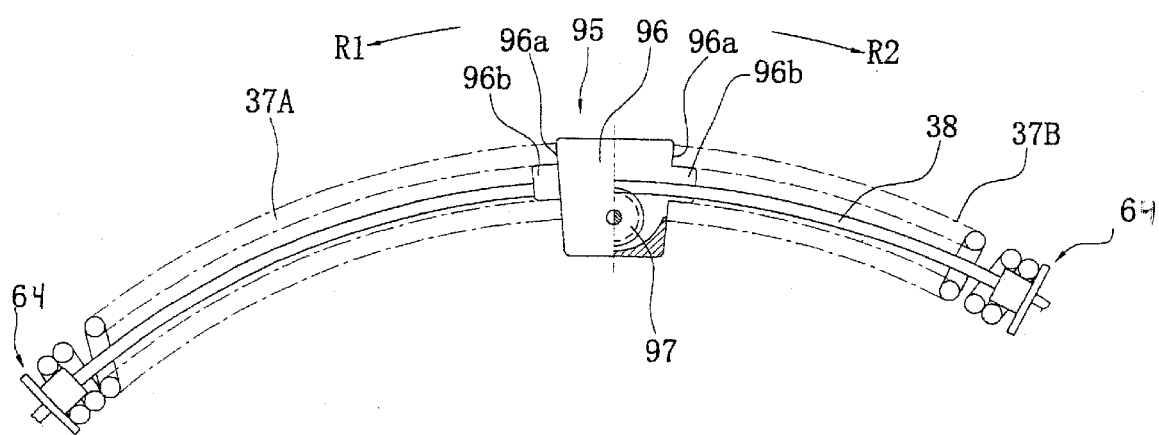
FIG. 11 is a partial plan view of a damper mechanism for use in a lockup device in accordance with a fourth embodiment of the present invention, with a portion of the main body removed for purposes of illustration.

In this damper mechanism, a plurality of first and second coil springs 37A and 37B are arranged for operation in series. As seen in FIG. 11, an adjacent pair of first and second coil springs 37A and 37B are illustrated. Of course, additional adjacent pairs of first and second coil springs 37A and 37B are arranged along the annular ring 38 to operate in series. In each of the adjacent pairs of coil springs, the first coil spring 37A is disposed on the R1 side, while the second coil spring 37B is disposed on the R2 side. The first coil springs 37A have a larger circumferential length and a lower spring constant than those of the second coil springs 37B. Thus, the first coil springs 37A have different compression characteristics from the second coil springs 37B. The spring seats 64 are arranged on the R1 side end of the first coil springs 37A. Likewise, the spring seats 64 are arranged on the R2 side end of the second coil springs 37B. Further, an intermediate spring seat 95 is disposed between the first and second coil springs 37A and 37B of each of the adjacent pairs of coil springs. Thus, when this variation is used within the damper mechanism 31 of the first embodiment, each spring 37 of the first embodiment is replaced with springs 37A and 37B and the intermediate spring seat 95.

Figure 12:
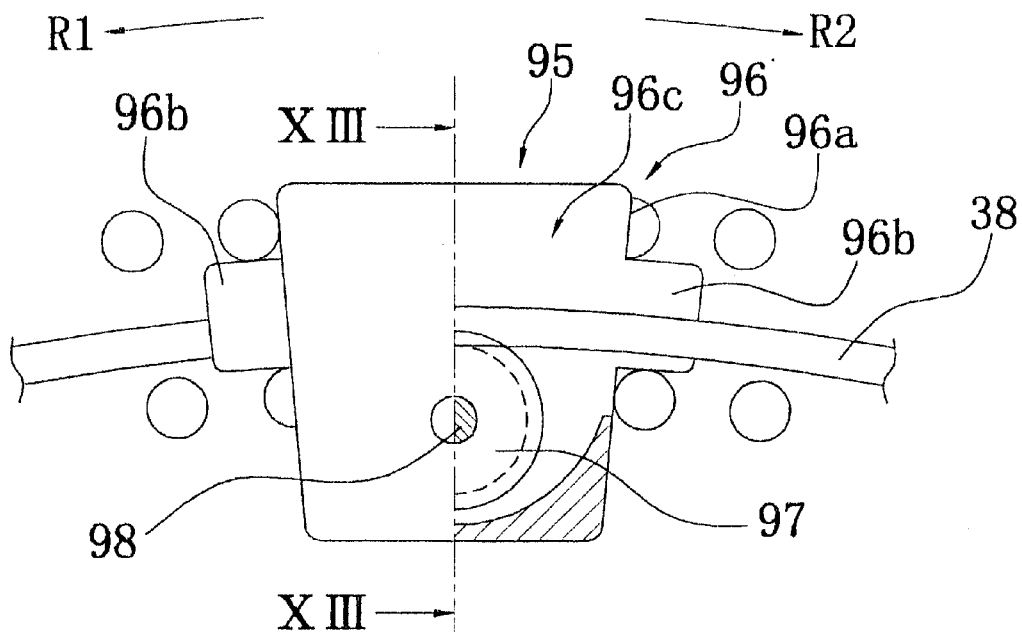
FIG. 12 is an enlarged partial view of the damper mechanism illustrated in FIG. 11 with a portion of the main body removed for purposed of illustration.
Figure 13:
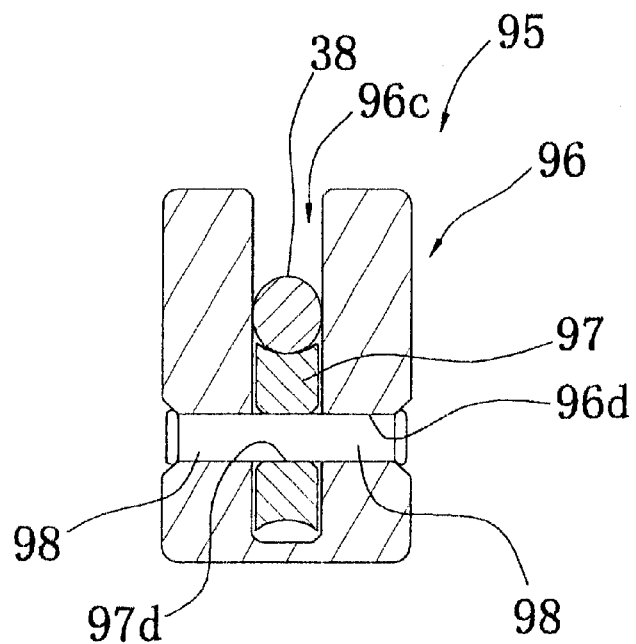
FIG. 13 is a transverse cross-sectional view of the damper mechanism, taken along section line XIII—XIII in FIG. 12.
Figure 14:
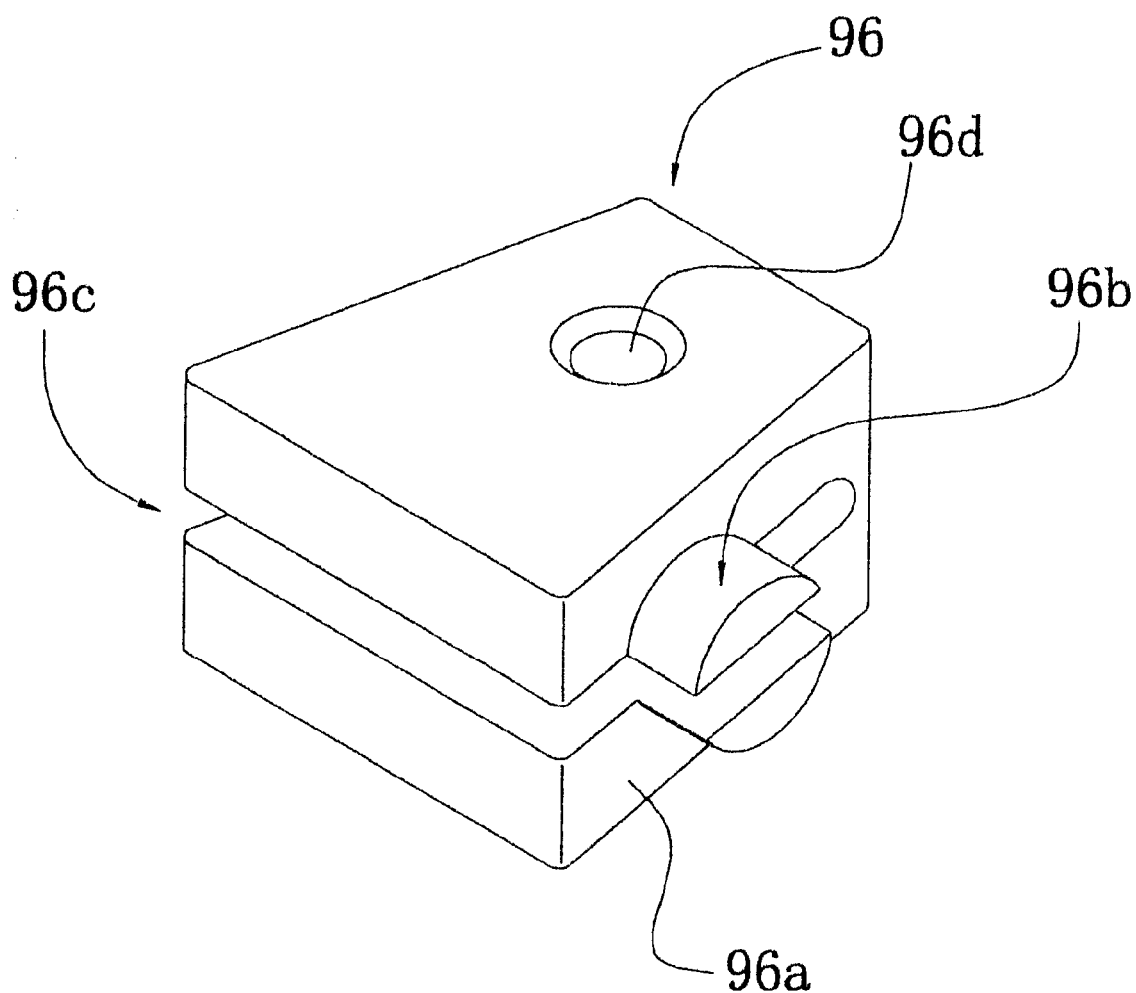
FIG. 14 is a perspective view of the main body of the intermediate seat for use in the lockup device in accordance with the fourth embodiment of the present invention.
Figure 15:
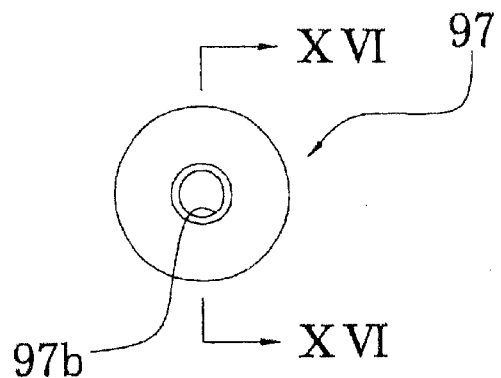
FIG. 15 is a plan view of a roller of the intermediate seat for use in the lockup device in accordance with the fourth embodiment of the present invention.
Figure 16:
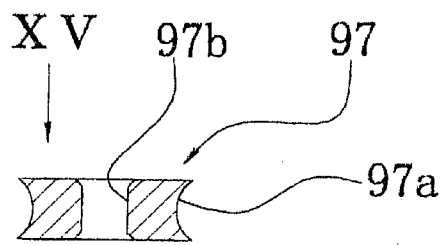
FIG. 16 is a cross-sectional view of the roller of the intermediate seat, taken along section line XVI—XVI in FIG. 15.
Figure 17:
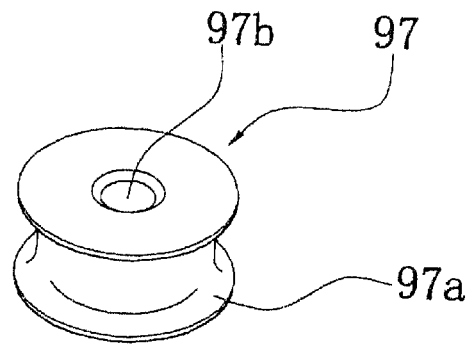
FIG. 17 is a perspective view of the roller of the intermediate seat for use in the lockup device in accordance with the fourth embodiment of the present invention.

More specifically, in each adjacent pair of coil springs, the intermediate spring seat 95 is disposed between the R2 side end of the first coil spring 37A and the R1 side end of the second coil spring 37B for transmitting the torque therebetween. Each intermediate spring seat 95 primarily includes a main body 96 and a roller 97. As seen in FIGS. 12–14, the main body 96 has a substantially square box-like shape, with seat surfaces 96a on its circumferentially opposite sides. The main body 96 has projections 96b that extend in circumferentially opposite directions from the seat surfaces 96a. The end surfaces of the first and second coil springs 37A and 37B are in contact with the seat surfaces 96a. The projections 96b are fitted into the first and second coil springs 37A and 37B so as to contact the inner sides thereof. The main body 96 has a groove 96c which divides the body 96 into two axially adjacent portions. The groove 96c extends from the radially outer periphery of the main body 96 to almost the radially inner periphery thereof The groove 96c axially divides each projection 96b into two portions.

As seen in FIGS. 15–18, each roller 97 is a columnar member having a smooth concavity on an axial section midpoint of an outer peripheral surface thereof More specifically, each roller 97 has a curved surface 97a and a central aperture 97b. Each roller 97 is rotatably mounted in the groove 96c of one of the main bodies 96 to rotate around an axis parallel to the rotation axis of the torque converter.

Referring to FIGS. 12–13, a pin 98 is fitted into a central aperture 97b of each roller 97. Opposite ends of each pin 98 are fixedly fitted into a central aperture 96d of one of the main bodies 96, such that the rollers 97 rotates relative to the main bodies 96.

Figure 18:
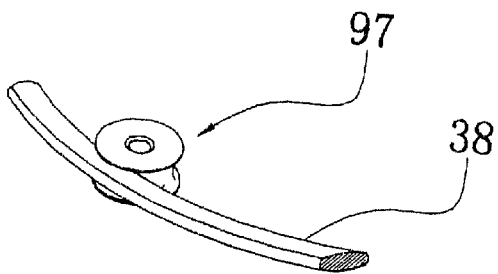
FIG. 18 is a partial perspective view of the roller and the ring for use in the lockup device in accordance with the fourth embodiment of the present invention.

The ring 38 extends through the grooves 96c of the main bodies 96 of the intermediate spring seats 95. More specifically, the ring 38 is located axially between the projections 96b, which are axially divided by the groove 96c. Consequently, as seen in FIGS. 12, 13 and 18, an inner peripheral portion of the ring 38 is in contact with or can contact the curved surfaces 97a of the rollers 97. Further, since the ring 38 is supported by axial side portions of the curved surfaces 97a of the rollers 97, there is a slight space (not shown) between the ring 38 and the axially adjacent side surfaces of the grooves 96c of the main bodies 96.

From the state shown in FIG. 11, as the driven plate or member rotates relative to the drive plate or member, the first coil springs 37A are first compressed. While the torsion angle is small, only the first coil springs 37A with small spring constants are compressed. At this point, the second coil springs 37B are hardly compressed. In the meantime, the ring 38 rotates together with the driven plate such that a relative rotation occurs between the ring 38 and the intermediate spring seats 95. At this point, the intermediate spring seat 95 moves radially outward due to a centrifugal force, with the rollers 97 being kept in contact with the ring 38. Consequently, the ring 38 rotates the rollers 97 as the ring 38 rotates relative to the intermediate spring seats 95. In this manner, friction due to sliding between the ring 38 and the intermediate spring seats 95 are suppressed. Consequently, low and therefore favorable hysteresis characteristics of the damper mechanism can be achieved. Also, since the ring 38 is axially supported by the rollers 97, the ring 38 is less likely to slide against the main bodies 96.

Fifth Embodiment

Figure 19:
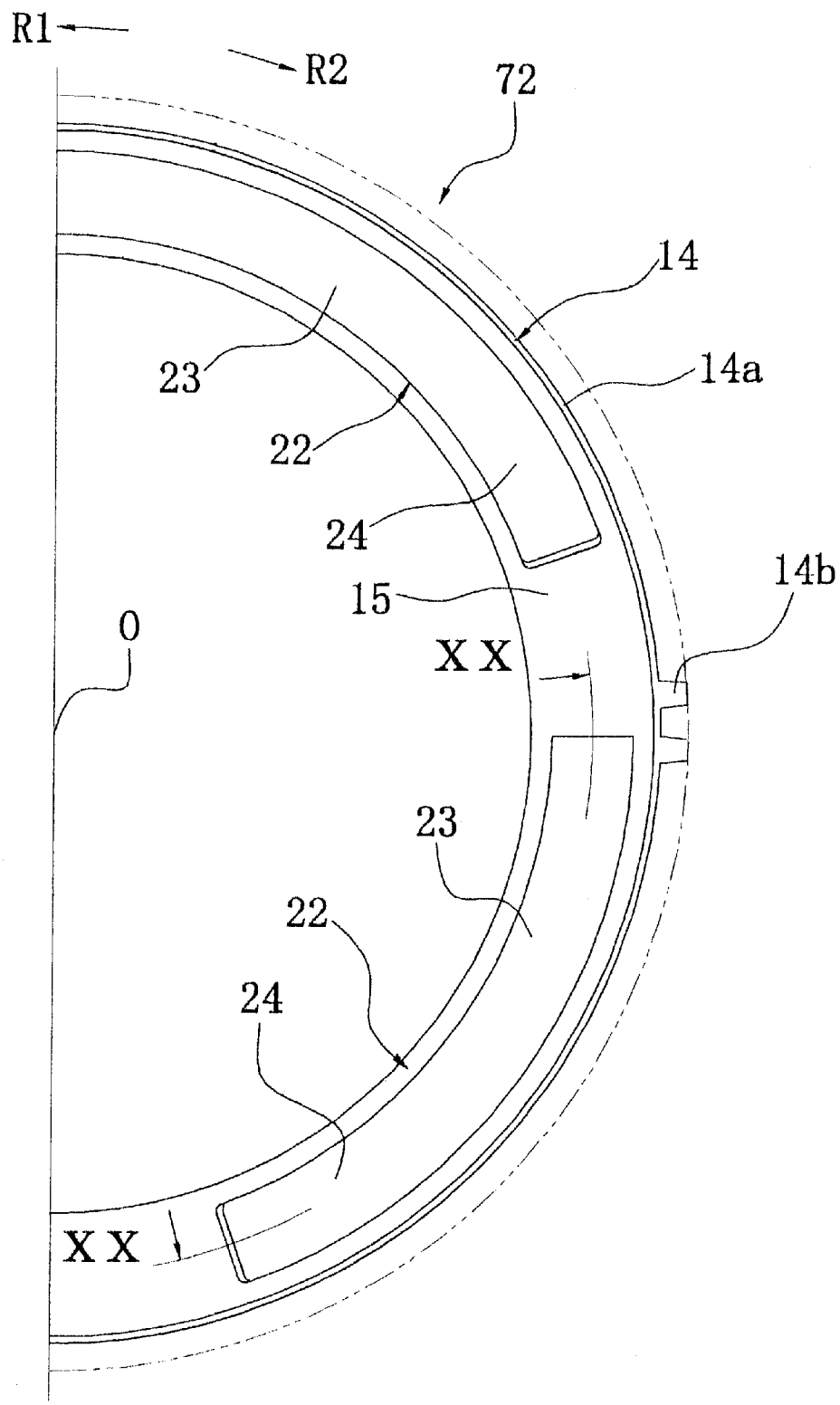
FIG. 19 is a partial plan view of a friction disk for use in a lockup device in accordance with a fifth embodiment of the present invention.
Figure 20:
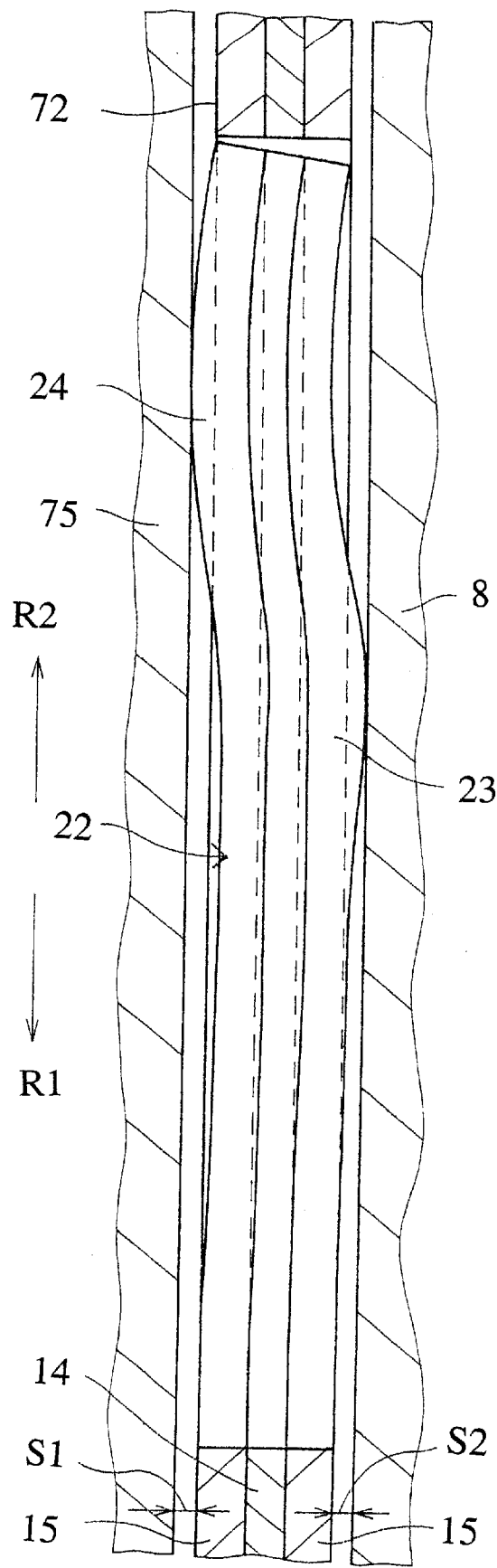
FIG. 20 is a partial cross-sectional view of the friction disk, taken along section line XX—XX in FIG. 19.

A friction disk 72 is illustrated in accordance with the fifth embodiment as shown in FIGS. 19–20. The friction disk 72 can be, for example, the same friction disk used in the lockup device 6' in accordance with the second embodiment. The friction disk 72 includes an annular core plate 14 and friction facings 15 fixedly coupled to axially opposite sides of the core plate 14. The core plate 14 includes an annular main body 14a and a plurality of teeth 14b formed on an outer periphery of the main body 14a.

The first friction disk 72 has a plurality of tongues 22 aligned in the circumferential direction for reducing a drag torque between an input member and an output member. The tongue 22 is an arc-shaped member that extends in the circumferential direction. The tongue 22 is formed by cutting and bending a part of the friction facings 15 and the core plate 14. As seen in FIGS. 19–20, a R1 side portion of the tongue 22 forms a base portion, while a R2 side portion forms an end portion 24. The R1 side is the direction of positive rotation of the lockup clutch. As seen in FIG. 20, the tongue 22 has an axially wavy form along the circumference. In other words, portions of the tongue 22 are in contact with the input member(the front cover 8), and other portions are in contact with the output member (the driven member 75) in the clutch released state. In this manner, a predetermined space is maintained between the rest of the friction facing 15 and the member opposing the friction facing 15.

As seen in FIG. 20 in more detail, the tongue 22 has a radial middle portion 23 which is located near the front cover 8. The radial middle portion 23 is in contact with the friction surface of the front cover 8 in the clutch released state. The end portion 24 of the tongue 22 is curved axially toward the transmission, so as to contact the friction surface of the driven member 75. Accordingly, an axial space S1 is maintained between the friction facing 15 (portions other than the tongues 22) and the driven member 75 in the clutch released state. Similarly, an axial space S2 is maintained between the friction facing 15 (portions other than the tongues 22) and the front cover 8. By creating the space between the first friction disk 72 and adjacent members in the clutch released state, drag torque can be reduced. Particularly, by utilizing a portion of the first friction disk, no additional member is required to achieve the same result. Accordingly, the lockup device can maintain a simple structure. Furthermore, the tongue 22 functions as a cushion in the clutch engagement state.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A lockup device for mechanically engaging and disengaging input and output members of a torque converter, said lockup device comprising:
   a clutch coupling portion; and
   a damper mechanism arranged to transmit torque to and from said clutch coupling portion, said damper mechanism having
      a drive member adapted to receive torque from the input member,
      a driven member adapted to transmit torque to the output member,
      a plurality of first coil springs arranged to transmit torque between said drive member and driven member, said plurality of first coil springs aligned in a rotational direction of the torque converter and extending in the rotational direction,
      an annular member arranged to allow movement of said plurality of first coil springs in the rotational direction while restricting movement of said first coil springs in other directions, said annular member being supported by one of said drive and driven members and extending through said plurality of first coil springs, and
      a plurality of spring seats arranged on opposite ends of said plurality of first coil springs, said spring seats having apertures with said annular member located therein, each of said spring seats having a seat portion and a projection, said seat portions being in contact with said first coil springs, said projections extending from said seat portions into said first coil springs for engagement therewith.

2. The lockup device as set forth claim 1, herein said one of said drive and driven members restricts radially outward movement of said annular member.

3. The lockup device as set forth claim 1, wherein said annular member is relatively non-rotatable with respect to said one of said drive and driven members.

4. The lockup device as set forth claim 1, wherein one of said drive and driven members is in contact with said spring seats to restrict radially outward movement of said spring seats.

5. The lockup device as set forth claim 1, wherein said one of said drive and driven members restricts relative rotation and radially outward movement of said annular member; and
   the other of said drive and driven members restricts radially outward movement of said spring seats while in contact with said spring seats.

6. The lockup device as set forth in claim 1, wherein said damper mechanism further includes a plurality of second coil springs arranged in the rotational direction on said annular member to operate in series with said first coil springs, said second coil springs having different compression characteristics from said first coil springs, and said second coil springs alternating in the rotational direction with said first coil springs.

7. A lockup device for mechanically engaging and disengaging input and output members of a torque converter, said lockup device comprising:
   a clutch coupling portion; and
   a damper mechanism arranged to transmit torque to and from said clutch coupling portion, said damper mechanism having
      a drive member adapted to receive torque from the input member,
      a driven member adapted to transmit torque to the output member,
      a plurality of first coil springs arranged to transmit torque between said drive member and driven member, said plurality of first coil springs aligned in a rotational direction of the torque converter and extending in the rotational direction,
      an annular member arranged to allow movement of said plurality of first coil springs in the rotational direction while restricting movement of said first coil springs in other directions, said annular member being supported by one of said drive and driven members and extending through said plurality of first coil springs,
      a plurality of second coil springs arranged in the rotational direction on said annular member to operate in series with said first coil springs, said second coil springs having different compression characteristics from said first coil springs, and said second coil springs alternating in the rotational direction with said first coil springs, and
      a plurality of end spring seats and a plurality of intermediate spring seats, a pair of said end spring seats being arranged on opposite ends of adjacent pairs of said first and second coil springs with one of said intermediate spring seats being located between said first and second coil springs of said adjacent pairs of said first and second coil springs, said end and intermediate spring seats having apertures with said annular member located therein, each of said end spring seats having a seat portion and a projection, said seat portions being in contact with said opposite ends of said adjacent pairs of said first and second coil springs, said projections extending from said seat portions into said opposite ends of said adjacent pairs of first and second coil springs for engagement therewith.

8. The lockup device as set forth in claim 7, wherein each of said intermediate spring seats has a seat portion and a roller, said seat portion of said intermediate spring seats being in contact with adjacent ends of said adjacent pairs of said first and second coil springs, said rollers being rotatable with respect to said seat portions of said intermediate spring seats around an axis parallel to an axial direction of said lockup device, said rollers arranged to contact a radially inner side of said annular member.

9. The lockup device as set forth in claim 8, wherein each of said rollers has a contact portion arranged to contact axial side portions of said annular member.

10. A torque converter adapted to be used to transmit torque from an input shaft to an output shaft, said torque converter comprising:
a front cover having a friction surface at an outer peripheral portion thereof;
an impeller fixedly coupled to said front cover to form a hydraulic chamber together with said front cover;
a turbine disposed opposite said impeller inside said hydraulic chamber, said turbine being adapted to be coupled to the output shaft;
a stator disposed between said impeller and said turbine; and
a lockup device for mechanically engaging and disengaging input and output members of said torque converter, said lockup device including a clutch coupling portion and a damper mechanism arranged to transmit the torque to and from said clutch coupling portion, said damper mechanism having
a drive member for receiving the torque from said input member,
a driven member transmitting the torque to the output member,
a plurality of first coil springs arranged to transmit torque between said drive member and driven member, said plurality of first coil springs aligned in a rotational direction of the torque converter and extending in the rotational direction,
an annular member for allowing movement of said plurality of first coil springs in the rotational direction and restricting movement of said first coil springs in other directions, said annular member supported by one of said drive and driven members and extending through said plurality of first coil springs, and
a plurality of spring seats arranged on opposite ends of said plurality of first coil springs, said spring seats having apertures with said annular member located therein, each of said spring seats having a seat portion and a projection, said seat portions being in contact with said first coil springs, said projections extending from said seat portions into said first coil springs for engagement therewith.

11. The torque converter as set forth in claim 10, wherein said one of said drive and driven members restricts radially outward movement of said annular member.

12. The torque converter as set forth claim 10, wherein said annular member is relatively unrotatable with respect to said one of said drive and driven members.

13. The torque converter as set forth claim 10, wherein one of said drive and driven members is in contact with said spring seats to restrict radially outward movement of said spring seats.

14. The torque converter as set forth claim 10, wherein said one of said drive and driven members restricts relative rotation and radially outward movement of said annular member; and
the other of said drive and driven members restricts radially outward movement of said spring seats while in contact with said spring seats.

15. The torque converter as set forth in claim 10, wherein said damper mechanism further includes a plurality of second coil springs arranged in the rotational direction on said annular member to operate in series with said first coil springs, said second coil springs having different compression characteristics from said first coil springs, and said second coil springs alternating in the rotational direction with said first coil springs.

16. The torque converter as set forth claim 10, wherein said damper mechanism is disposed on a transmission side with respect to said piston.

17. The torque converter as set forth in claim 12, wherein said lockup device is disposed on an engine side with respect to said piston.

18. The torque converter as set forth in claim 10, wherein said damper mechanism is disposed on an engine side with respect to said piston.

19. A torque converter adapted to be used to transmit torque from an input shaft to an output shaft, said torque converter comprising:
a front cover having a friction surface at an outer peripheral portion thereof;
an impeller fixedly coupled to said front cover to form a hydraulic chamber together with said front cover;
a turbine disposed opposite said impeller inside said hydraulic chamber, said turbine being adapted to be coupled to the output shaft;
a stator disposed between said impeller and said turbine; and
a lockup device for mechanic ally engaging and disengaging input and output members of said torque converter, said lockup device including a clutch coupling portion and a damper mechanism arranged to transmit the torque to and from said clutch coupling portion, said damper mechanism having
a drive member for receiving the torque from said input member,
a driven member transmitting the torque t o the output member,
a plurality of first coil springs arranged to transmit torque between said drive member and driven member, said plurality of first coil springs aligned in a rotational direction of the torque converter and extending in the rotational direction,
an annular member for allowing movement of said plurality of first coil springs in the rotational direction and restricting movement of said first coil springs in other directions, said annular member supported by one of said drive and driven members and extending through said plurality of first coil springs,
a plurality of second coil springs arranged in the rotational direction on said annular member to operate in series with said first coil springs, said second coil springs having different compression characteristics from said first coil springs, and said second coil springs alternating in the rotational direction with said first coil springs, and
a plurality of end spring seats and a plurality of intermediate spring seats, a pair of said end spring seats being arranged on opposite ends of adjacent pairs of said first and second coil springs with one of said intermediate spring seats being located between said first and second coil springs of said adjacent pairs of said first and second coil springs, said end and intermediate spring seats having apertures with said annular member located therein, each of said end spring seats having a seat portion and a projection, said seat portions being in contact with said opposite ends of said adjacent pairs of said first and second coil springs, said projections extending from said seat portions into said opposite ends of said adjacent pairs of first and second coil springs for engagement therewith.

20. The torque converter as set forth in claim 19, wherein each of said intermediate spring seats has a seat portion and a roller, said seat portion of said intermediate spring seats being in contact with adjacent ends of said adjacent pairs of said first and second coil springs, said rollers being rotatable with respect to said seat portions of said intermediate spring seats around an axis parallel to an axial direction of said lockup device, said rollers arranged to contact a radially inner side of said annular member.

21. The torque converter as set forth in claim 20, wherein each of said rollers has a contact portion arranged to contact axial side portions of said annular member.

\* \* \* \* \*